UNITED STATES PATENT OFFICE.

ALBERT WELLER AND ANDREAS JENSEN, OF FRANKFORT-ON-THE-MAIN, GERMANY, ASSIGNORS TO VEREINIGTE CHININFABRIKEN, ZIMMER & CO., GESELLSCHAFT MIT BESCHRÄNKTER HAFTUNG, OF SAME PLACE.

MENTHOL COMPOUND.

SPECIFICATION forming part of Letters Patent No. 574,966, dated January 12, 1897.

Application filed March 31, 1896. Serial No. 585,630. (No specimens.)

*To all whom it may concern:*

Be it known that we, ALBERT WELLER and ANDREAS JENSEN, subjects of the Emperor of Germany, and residents of Frankfort-on-the-Main, Germany, have invented certain new and useful Improvements in Pharmaceutical Preparations, of which the following is a specification.

The fact that menthol is fit to be applied externally as a remedy for certain ailments is generally known, but it has hitherto only to a limited extent been administered as medicine for internal use, notwithstanding its conspicuous stimulating and restorative properties.

The main difficulty that has so far stood in in the way of its introduction into use as medicine to be taken internally is its acrid burning taste, a difficulty enhanced by the absence of any suitable solvent for it. The fact is that the usual solvents of menthol are either altogether unsuited to internal use (such, for example, being the case with chloroform, sulfuret of carbon, ligroin, and the like) or if brought to the requisite degree of concentration they are incapable of overcoming the pungent taste of menthol or of checking its irritating action upon the mucous membranes, and in case of alcohol and ether, for instance, the irritation is actually intensified.

Natural peppermint-oil contains menthol in widely-varying proportions and would not, therefore, admit of dosing with the requisite precision, in addition to which, owing to the presence of its other constituents, it precludes the menthol proper from producing its full effect.

We have discovered that fluid ethers, such as are obtainable from fatty or other acids and menthol, and among which the ether of menthol and valeric acid may be particularly instanced, are solvents which enable the menthol to be dosed very exactly, the menthol being soluble in them in any desired proportions. The valeric acid used is the common merchantable acid, which has the formula $(CH_3)_2CH.CH_2.CO_2H$. These ethers at the same time render the menthol non-injurious to the human system, and even where solutions containing high percentages of menthol are prepared through their agency these solvents have the property of considerably tempering the taste of the menthol, while they assist its action and render it effective and lasting, so that a small quantity of the solution suffices to produce most powerful effects without causing any caustic or irritating action, such as would unavoidably occur were the menthol taken either pure or dissolved in any other solvent. The said menthol solutions can be prepared as follows: The required quantity of pure menthol may either be dissolved in pure menthol ether or in preparing this ether only part of the menthol employed may be converted into ether, instead of the entire quantity. The amount of unconverted menthol may be readily determined by saponifying the ether and then proportioning it to the desired percentage.

Good preparations have been obtained by dissolving from ten to thirty per cent. of menthol in menthol ether of valeric acid; but the composition may be varied according to requirements. Solutions such as these will prove to be excellent restoratives and invigorators, with the additional advantage of being free from that sharpness or causticity which are peculiar to other restorative agents, such as camphor, ether, musk, and the like. The instantaneous effect of the free menthol contained therein is, when once produced, unremittingly sustained by the solvent, owing to its being a menthol ether, while at the same time the valeric acid manifests its extremely beneficial effect on the stomach and nervous system without the offensive and nauseous odor and taste of the valerian being noticeable.

What we claim is—

1. The herein-described process of preparing a menthol preparation for internal use consisting in dissolving menthol in the menthol ether of valeric acid, as and for the purpose set forth.

2. As an article of manufacture menthol dissolved in the menthol ether of valeric acid.

In testimony whereof we have signed our names to this specification in the presence of two subscribing witnesses.

ALBERT WELLER.
    ANDREAS JENSEN.

Witnesses:
  WILHELM EITCH,
  THEOPHIL REZELMANNY.